(12) United States Patent
Chen et al.

(10) Patent No.: US 8,126,839 B2
(45) Date of Patent: Feb. 28, 2012

(54) METHODS AND APPARATUSES FOR ADAPTING A RANKING FUNCTION OF A SEARCH ENGINE FOR USE WITH A SPECIFIC DOMAIN

(75) Inventors: Keke Chen, Sunnyvale, CA (US); Rongqing Lu, Snoqualmie, WA (US); Chung Kei Wong, Fremont, CA (US); Gordon Guo-Zheng Sun, Redwood City, CA (US); Larry Heck, Los Altos, CA (US); Belle Tseng, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 377 days.

(21) Appl. No.: 12/142,672

(22) Filed: Jun. 19, 2008

(65) Prior Publication Data

US 2009/0319507 A1     Dec. 24, 2009

(51) Int. Cl.
*G06F 17/30* (2006.01)
*G06F 17/00* (2006.01)

(52) U.S. Cl. ............... 707/603; 707/600; 702/19
(58) Field of Classification Search .......... 707/600, 707/603; 702/19
See application file for complete search history.

(56) References Cited

U.S. PATENT DOCUMENTS

| | | | | |
|---|---|---|---|---|
| 6,003,036 A * | 12/1999 | Martin | ................. | 1/1 |
| 6,381,605 B1 * | 4/2002 | Kothuri et al. | ................. | 1/1 |
| 7,197,497 B2 * | 3/2007 | Cossock | ................. | 1/1 |
| 7,223,234 B2 * | 5/2007 | Stupp et al. | ................. | 600/300 |
| 7,781,431 B2 * | 8/2010 | Attenni et al. | ................. | 514/233.8 |

OTHER PUBLICATIONS

Agichtein, et al., "Improving Web Search Ranking by Incorporating User Behavior Information" SIGIR '06, Aug. 6-11, 2006, Seattle, WA, 8 pgs.
Bacchiani, et al., "Unsupervised Language Model Adaptation" Proceedings of the International Conference on Acoustics, Speech and Signal Processing (ICASSP), 2003, 4 pgs.
Blitzer et al., "Domain Adaptation with Structural Correspondence Learning" In Conference on Empirical Methods in Natural Language Processing, Sydney, Australia, 2006, 9 pgs.
Burges et al., "Learning to Rank with Nonsmooth Cost Functions" Proc. Of Neural Information Processing Systems (NIPS), 2006, 8 pgs.
Burges et al., "Learning to Rank Using Gradient Descent" Proc. Of Intl. Conf. on Machine Learning (ICML), Germany, 2005, 8 pgs.
Cao et al., "Adapting Ranking SVM to Document Retrieval" SIGIR '06, Seattle, WA, Aug. 6-11, 2006, 8 pgs.
Cao et al., "Learning to Rank: From Pairwise Approach to Listwise Approach" In ICML '07: Proceedings of the 24th international conference on Machine learning, Corvallis, OR, 2007, 8 pgs.
Daume III et al., "Domain Adaptation for Statistical Classifiers" Journal of Artificial Intelligence Research 26, 2006, pp. 101-126.
Freund et al., "An Efficient Boosting Algorithm for Combining Preferences" Journal of Machine Learning Research 4, 2003, pp. 933-969.
Friedman, "Greedy Function Approximation: A Gradient Boosting Machine" Annals of Statistics, Feb. 24, 1999, 34 pgs.

(Continued)

*Primary Examiner* — Yicun Wu
(74) *Attorney, Agent, or Firm* — Berkeley Law & Technology Group, LLP (57) ABSTRACT

Methods and apparatuses are provided for adapting hierarchical structure information associated with a first ranking function tuned for use in a first domain for use in a second domain.

20 Claims, 5 Drawing Sheets

OTHER PUBLICATIONS

Hwa, "Supervised Grammar Induction Using Training Data with Limited Constituent Information" Proceedings of the Conference of the Association for Computational Linguistics (ACL), May 2, 1999, 7 pgs.

Jarvelin, et al., "IR Evaluation Methods for Retrieving Highly Relevant Documents" Proc. of ACM SIGIR Conference, New York, NY, 2000, pp. 41-48.

Jiang et al., "Instance Weighting for Domain Adaptation in NLP" In Conference of the Association for Computational Linguistics (ACL), Jun. 2007, pp. 264-271.

Joachims, "Optimizing Search Engines Using Clickthrough Data" Proc. of ACM SIGKDD Conference, Edmonton, Alberta, Canada, 2002, 10 pgs.

Joachims, et al., "Accurately Interpreting Clickthough Data as Implicit Feedback" SIGIR '05, Salvador, Brazil, Aug. 15-19, 2005, 8 pgs.

Leggetter, et al. Flexible Speaker Adaptation Using Maximum Likelihood Linear Regression. Proceedings of Eurospeech, 1995, 6 pgs.

Liu et al., "LETOR: Benchmark Dataset for Research on Learning to Rank for Information Retrieval" SIGIR '07 Workshop of Learning to Rank for Information Retrieval, 2007, pp. 3-10.

Nallapati, "Discriminative Models for Information Retrieval" SIGIR '04, Sheffield, South Yorkshire, UK, Jul. 25-29, 2004, 8 pgs.

Raina et al., "Constructing Informative Priors Using Transfer Learning" Proceedings of the $23^{rd}$ International Conference on Machine Learning, Pittsburgh, PA, 2006, 8 pgs.

Sun et al., "Popularity Weighted Ranking for Academic Digital Libraries" ECIR 2007, pp. 605-612.

Tsai et al., "FRank: A Ranking Method with Fidelity Loss" SIGIR '07, Amsterdam, The Netherlands, Jul. 23-27, 2007, 8 pgs.

Xu et al., "AdaRank: A Boosting Algorithm for Information Retrieval" SIGIR '07, Amsterdam, The Nethelands, Jul. 23-27, 2007, 8 pgs.

Zheng et al., "A Regression Framework for Learning Ranking Functions Using Relative Relevance Judgments" SIGIR '07, Amsterdam, The Netherlands, Jul. 23-27, 2007, 8 pgs.

Hastie et al., "The Elements of Statistical Learning" Springer-Verlag, 2001, pp. 266-271.

* cited by examiner

METHODS AND APPARATUSES FOR ADAPTING A RANKING FUNCTION OF A SEARCH ENGINE FOR USE WITH A SPECIFIC DOMAIN

BACKGROUND

1. Field

The subject matter disclosed herein relates to data processing, and more particularly to ranking functions and related information extraction and information retrieval methods and apparatuses.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and apparatuses that allow for relevant information to be identified and presented in an efficient manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some portions of the detailed description which follow are presented in terms of algorithms and/or symbolic representations of operations on data bits or binary digital signals stored within memory, such as memory within a computing system and/or other like computing device. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

With this in mind, some exemplary methods and apparatuses are described herein that may be used to establish a ranking function or the like, which may be used by a search engine or other like tool to determine how to respond to a search query. More specifically, as illustrated in the example implementations described herein, data that is associated with an existing ranking function that may be tuned and/or otherwise trained for use in a domain may be adapted for use in another domain using the techniques herein.

The methods and arrangements described herein may, for example, be implemented to provide a machine learned ranking (MLR) function and/or other like evaluation model that may be adapted to determine a model judgment value associated with a web document, search result summary, and/or the like. Such a ranking function or evaluation model may be established through a learning process based, at least in part, on training data (e.g., human judgment values, model judgment values, etc.) associated with a set of web documents, search results, search result summaries, and/or other like searchable information that may be associated with a first domain (e.g., a source domain) and/or a second domain (e.g. a target domain). Such methods and apparatuses may, for example, allow for at least a portion of hierarchical structure information associated with a first ranking function established for use in a first domain to be efficiently adapted for use in a second domain. Thus, for example, a second ranking function may be established for use in a second domain, by adapting the hierarchical structure information based, at least in part, on a reduced amount of training data associated with the second domain as might typically be required.

Before describing such exemplary methods and apparatuses in greater detail, the sections below introduce certain aspects of an exemplary computing environment in which information searches may be performed, and an introduction to some exemplary hierarchical structures that may be implemented in ranking functions.

The Internet is a worldwide system of computer networks and is a public, self-sustaining facility that is accessible to tens of millions of people worldwide. Currently, the most widely used part of the Internet appears to be the World Wide Web, often abbreviated "WWW" or simply referred to as just "the web". The web may be considered an Internet service organizing information through the use of hypermedia. Here, for example, the HyperText Markup Language (HTML) may be used to specify the contents and format of a hypermedia document (e.g., a web page).

Unless specifically stated, an electronic or web document may refer to either source code used for generation of a particular web page or the web page itself. Each web page may contain embedded references to images, audio, video, other web documents, etc. One common type of reference used to identify and locate resources on the web is a Uniform Resource Locator (URL).

In the context of the web, a user may "browse" for information by following references that may be embedded in each of the documents, for example, using hyperlinks provided via the HyperText Transfer Protocol (HTTP) or other like protocol.

Through the use of the web, individuals may have access to millions of pages of information. However, because there is so little organization to the web, at times it may be extremely difficult for users to locate the particular pages that contain information that may be of interest to them. To address this problem, a mechanism known as a "search engine" may be employed to index a large number of web pages and provide an interface that may be used to search the indexed information, for example, by entering certain words or phases to be queried.

A search engine may, for example, include or otherwise employ on a "crawler" (also referred to as "crawler", "spider", "robot") that may "crawl" the Internet in some manner to locate web documents. Upon locating a web document, the crawler may store the document's URL, and possibly follow any hyperlinks associated with the web document to locate other web documents.

A search engine may, for example, include information extraction and/or indexing mechanisms adapted to extract and/or otherwise index certain information about the web documents that were located by the crawler. Such index information may, for example, be generated based on the contents of an HTML file associated with a web document. An indexing mechanism may store index information in a database.

A search engine may provide a search tool that allows users to search the database. The search tool may include a user interface to allow users to input or otherwise specify search terms (e.g., keywords or other like criteria), and receive and view search results. A search engine may present the search results in a particular order, for example, as may be indicated by a ranking scheme. For example, such a search engine may present an ordered listing of search result summaries in a search results display. Each search result summary may, for example, include information about a website or web page such as a title, an abstract, a link, and possibly one or more other related objects such as an icon or image, audio or video information, computer instructions, or the like.

Ranking functions may be employed by a search engine or other like process/tool to identify and/or help to identify one or more query results (e.g., web documents, summaries, and/or other information possibly relating to a query). While many of the examples presented herein are directed towards search engines and/or other like processes/tools associated with the Web, it should be understood that the techniques provided herein are not so limited and neither is claimed subject matter. Indeed, methods and apparatuses provided herein may be adapted for use with any type or searchable data and/or related data searching process/tool. For example, a database application or the like may be adapted in accordance with the techniques provided herein.

Machine learning techniques have been applied to search engines and in particular to help establish ranking functions. Such machine learning techniques often rely on training data, which may be time consuming and/or expensive to collect. Unfortunately, there may be situations wherein there is an insufficient amount of training data, time, and/or resources available to effectively establish a ranking function for a specific (search) domain using traditional machine learning techniques. Fortunately, methods and apparatuses provided herein present techniques that allow existing information associated with an established ranking function (whether machine trained or not) to be used and/or otherwise adapted for use in establishing a ranking function for use with another domain.

For example, in one accordance with certain implementations, tree based ranking function adaptation (e.g., "tree adaptation") techniques are provided which may be used to efficiently adapt ranking functions trained with a Gradient Boosting Trees (GBT) method, and/or other like methods. Such tree adaptation techniques may be implemented to take a ranking function from a source domain and essentially "tune" all or a portion of an associated (hierarchical) tree based structure based, at least in part, on a limited (e.g., reduced, small) amount of training data associated with a target domain. Several exemplary processes are provided herein to illustrate adapting such a tree structure or other hierarchical structure, for example, by considering both the distribution of training data associated with the source domain and training data associated with the target domain to train a high quality ranking function for the target domain.

Machine learning with regard to ranking functions may allow for the continuous and efficient improvement in searching. Here, for example, one or more machine learning algorithms may be applied to a set of examples of labeled web search relevance to learn a ranking function. Due to increasing demands from different web search domains, for example, different regions, countries, markets, fields, etc., there is often a need or desire to provide more effective domain-specific ranking functions and to continuously improve such. If applying learning to rank to different domains, especially new and/or growing domains, one challenge may be a lack of training data (e.g., human user training data). To obtain such training data, one may use trained editors (relevance experts) to judge the relevance of sampled web search results. As mentioned, such processes may be time-consuming and expensive. Although there are methods to extract relevance judgment from implicit user feedbacks (e.g., via monitoring, click-through logs, etc.), expert-labeled training data is usually regarded as more reliable for training a ranking function.

Hence, in accordance with an aspect of the present description, it is recognized that it may be beneficial to effectively utilize a relatively small amount of training data for a new domain. Further, while each domain and/or domain-specific search may have its own characteristics, intuitively many may share certain commonality and/or some subtle characteristics. As such, a ranking function established for use in one domain may work reasonably well crossing different domains. However, there may be a desire to improve on such performance, for example, by establishing an adapted ranking function and/or the like via machine learning.

In the following example implementations, it will be assumed that the established source ranking function has been trained using a known method, such as, for example, a gradient boosting trees (GBT) method based on J. H. Friedman's, *Greedy Function Approximation: A Gradient Boosting Machine*, published in the Annals of Statistics 29, 5 (2001), 1189-1232. Thus, it will be assumed that the base model trained with GBT works sufficiently well in the target domain. Since gradient boosting trees include a series of regression decision trees, they tend to be quite interpretable and/or tunable. Based on the understanding of such a hierarchical structure and how a regression decision may be generated, several exemplary techniques are presented herein that may be implemented to adapt established a base model with the limited amount of training data available for a target domain. By doing this, one may essentially incorporate at least a portion the knowledge learned by the base model in a newly established model tuned to the target domain. It should be recognized that the example techniques provided herein may be applied to other like tree-based learning algorithms. GBT is just one example of a tree-based learning algorithm.

Additionally, in the examples herein it will be assumed that there exists at least some amount of training data from the target domain. Such training data may, for example, include labeled training data from reviewers/experts, and/or monitored and/or otherwise derived training data associated with one or more users.

In establishing training data, relevance experts may, for example, assign a grade to a pair of (query, web page) based on the relevance of the corresponding web page (often represented by URL) to a query. Such a grading scheme may include multiple grades, for example, using (1, 2, 3, 4, and 5) to represent different levels of relevance. With such multigrade labels, it has been shown that the GBT method may be an effective ordinal regression method for modeling ranking functions by search engines and/or other like processes/tools.

In a learning to rank approach, expert judged results (query, URL, grade) may be transformed to training data examples $\{(x_i; t_i)\}$. Here, $x_i$ represents a feature vector describing one or more features associated with the (query, URL); and $t_i$ is the target value from a set of grades, e.g., (1, 2, 3, 4, 5) that represents different levels of relevance between the query and the URL as determined by the relevance expert for each pair of query/URL. The task of learning to rank is to learn a function from the training examples $\{(x_i; t_i)\}$ that may predict the target value if given a feature vector for an unseen (query, URL) pair. Such a ranking function may output a score for the (query, URL) pair. Here, for example, one may sort the outputs of the ranking function for a set of $(q; u_i)$ pairs and display the sorted list of URLs for the given query q.

There are a variety of features that may be available and as such considered for use in ranking. By way of example but not limitation, in certain implementations, for each query-document pair, there may be one or more features selected from and/or otherwise related to one or more of the following exemplary categories.

Category 1: Features modeling user query, $x^Q$, which may include, for example, features dependent on the query q only and which may have constant values across all the web documents $d \in D$. Such features may include, e.g., the number of terms in the query, frequency of the terms in the corpus, whether it is a name query, adult query, or navigational query, etc.

Category 2: Features modeling, $x^D$, which may include, for example, features that may be dependent on the web document d only and which may have constant values across all the queries $q \in Q$. Such features may include, e.g., the number of inbound links pointing to the web document, the number of anchor-texts for the web document, the language identify of the web document, whether it is a spam page, etc.

Category 3: Features modeling the query-document relationship, $x^{QD}$, which may include, for example, features that may be dependent on a relation of the query q with respect to the web document d. Such features may include, e.g., the number of times each query term appears in the web document, the number of times each query term appears in the anchor-texts of the document, etc.

To help further illustrate an exemplary tree adaptation, a brief description into the structure of some exemplary boosted tree and how such trees may be trained will now be provided. It should, however, be understood that these are examples and not intended to limit claimed subject matter.

The idea of tree adaptation is based on the structural characteristics of GBT. This section will provide an overview of some of the basic settings for certain exemplary tree adaptation techniques, including some notations and learning mechanisms of an exemplary GBT method.

Boosted trees are a series of decision trees, which may be denoted by $h_i(x)$. A prediction function may be based on these decision trees.

$$H(x) = \sum_{i=1}^{k} \gamma_i h_i(x)$$

wherein, $\gamma_i$ is a small "shrinkage" factor, e.g., 0.05. For additional information on the concrete training algorithm the reader is directed, for example, to the previously-referenced article by J. H. Friedman. Briefly, it trains the k-th tree based on the previous trees $h_j, 1 \leq j < k$, with a set of random samples from the training data. Some steps for an exemplary gradient boosting regression may include, for example: (1) randomly sample the training data to get a subset of training examples $S_k$; (2) fit each training example (x; t) to the prediction function $$h^{k-1}(x) = \sum_{i=1}^{k-1} \gamma_i h_i(x)$$

based on the previously trained k−1 $h_i, 1 \leq i < k$, and get the residue r=t−t̂, where t̂ is the output of $H^{k-1}(x)$; (3) train the regression decision tree $h_k$ with the examples $\{(x,r)\}$ and minimize the loss function, for example, using mean square error (MSE).

Figure 1:
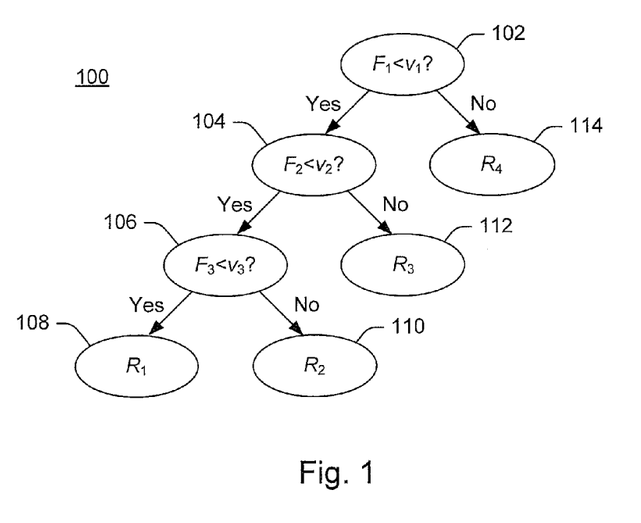
FIGS. 1 and 2 are graphical depictions of certain hierarchical structure information that may be associated with ranking function.

Note, that step (3) above may allow for "growing a tree" by splitting a leaf node. FIG. 1 shows, for example, a trained decision tree 100, which in this example is a binary tree with one predicate at each internal node. Here, for example, tree 100 includes a root node 102, internal nodes 104, and 106, and leaf nodes 108, 110, 112, and 114. In such a tree, an internal tree node iteratively partitions the training data splitting the node into two parts with the corresponding condition defined in the node. In the following, an exemplary process is described which may be implemented to decide which feature and which splitting value (e.g. threshold) may be used for a current node.

Here, for example, it will be assumed that a leaf node has been selected for splitting. As such, for example, there may be three subtasks to be performed: (1) finding an appropriate feature, (2) determining a cutting threshold, and (3) calculating a predict value for a partition, so that an overall MSE may be decreased most by splitting this node (e.g., a so-called "best-first" process). Thus, for example, assuming that there are $n_i$ training records reaching a node i, each of which has a target value $r_{ij}$ to fit at the current node. The best-effort estimate for all residues in the current node is the mean of $r_{ij}$, i.e., $$\hat{r}_i = \frac{1}{n_i}\sum_{j=1}^{n_i} r_{ij}.$$

Let $F_i$ denote the feature i and $v_{i,j}$ be a candidate threshold for $F_i$. Thus, $(F_i, v_{i,j})$ partitions the data into two parts: i.e., those records with $F_i$,<$v_{i,j}$ go to the left subtree (to internal node 104) and the rest records go to the right subtree (to leaf node 114). Let the MSE for the current node denoted by $$E, E = \sum_{j=1}^{n_i}(r_{ij} - \hat{r}_i)^2$$

if we take the mean of the residues, $\hat{r}_i$, as the predicted value. Similarly, let L be the MSE for the left subtree, and R for the right subtree. Thus, one may calculate L and R for different partition $(F_i, v_{i,j})$, and try to find a partition $(F_i, v_{i,j})$ minimizing the following error.

$$\arg\min_{(F_i, v_{i,j})}\{L+R\}$$

Figure 2:
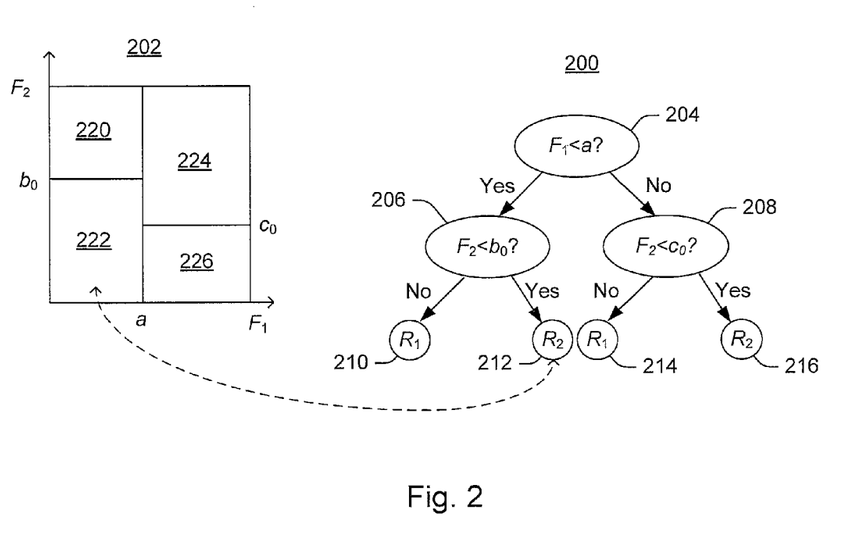

FIG. 2 illustrates a tree 200 fitted to the underlying target value distribution 202. Here, for example, tree 200 includes a root node 202, internal nodes 206 and 208, and leaf nodes 210, 212, 214, and 216. Here, for example, target value distribution 202 includes target values in areas 220, 222, 224, and 226. Thus, the mean of the target values in area 220 fall to leaf node 210, the mean of the target values in area 222 fall to leaf node 212, the mean of the target values in area 224 fall to leaf node 214, and the mean of the target values in area 226 fall to leaf node 216.

To finding a best node for splitting, for example, one my use the above cost function and further define a gain of splitting the current node as E−(L+R). A greedy search procedure may be applied to determine a leaf node for splitting as that which has the highest gain among existing leaf nodes, e.g., applying the best-first process.

During such a growing phase the mean predicted value $\hat{r}_i$ for the training data target values $r_{ij}$ falling onto the current node may be recorded as the response of this node, and the residues $r_{ij}$-$\hat{r}_i$ may be used as the new target values for its child nodes. Let $\{\hat{r}_i'\}$ denote the responses along a path from a root to a leaf node t. Thus, the predicted response $R_t$ for the leaf node t is the sum of the responses along the path.

$$R_l = \sum_i r_i^l$$

Note that the above exemplary process may be considered a "hill-climbing" process, which does not guarantee to get a globally optimal tree. Those skilled in the art will recognize that there are certain other strategies or processes that may be adapted for use. Here, in certain implementations, however, this exemplary process appears to be significantly efficient, especially if there are many features (e.g., greater than a hundred features).

When a tree with a desired number of leaf nodes is "grown", the next tree may be generated with the same procedure, for example, using the residues of the prediction on the previously generated trees as the target values for regression.

With this better understanding of an exemplary tree structure and the mechanism of how boosted trees may be generated, attention is directed to certain exemplary adaptation processes and strategies that may be implemented to adapt such hierarchical structure information based, at least in part, on a distribution of training data associated a source domain and a target domain.

With the assumption that the base model has done reasonably good prediction for the target domain, it seems reasonable to hypothesize that the training data used for training the base model for the source domain may have roughly similar distribution to the expected distribution for the target domain, but which as presented earlier may not be fully or otherwise adequately described by the available (e.g., small amount of) training data associated with the target domain. However, herein it is recognized therefore that certain differences between the target domain and the source domain might be at least partially captured by the available training data from the target domain. In order to fully utilize the small data and further improve the quality of ranking, one may therefore seek to incorporate these subtle differences to a new model, ranking function, search engine, and/or the like, for use with the target domain.

Figure 3:
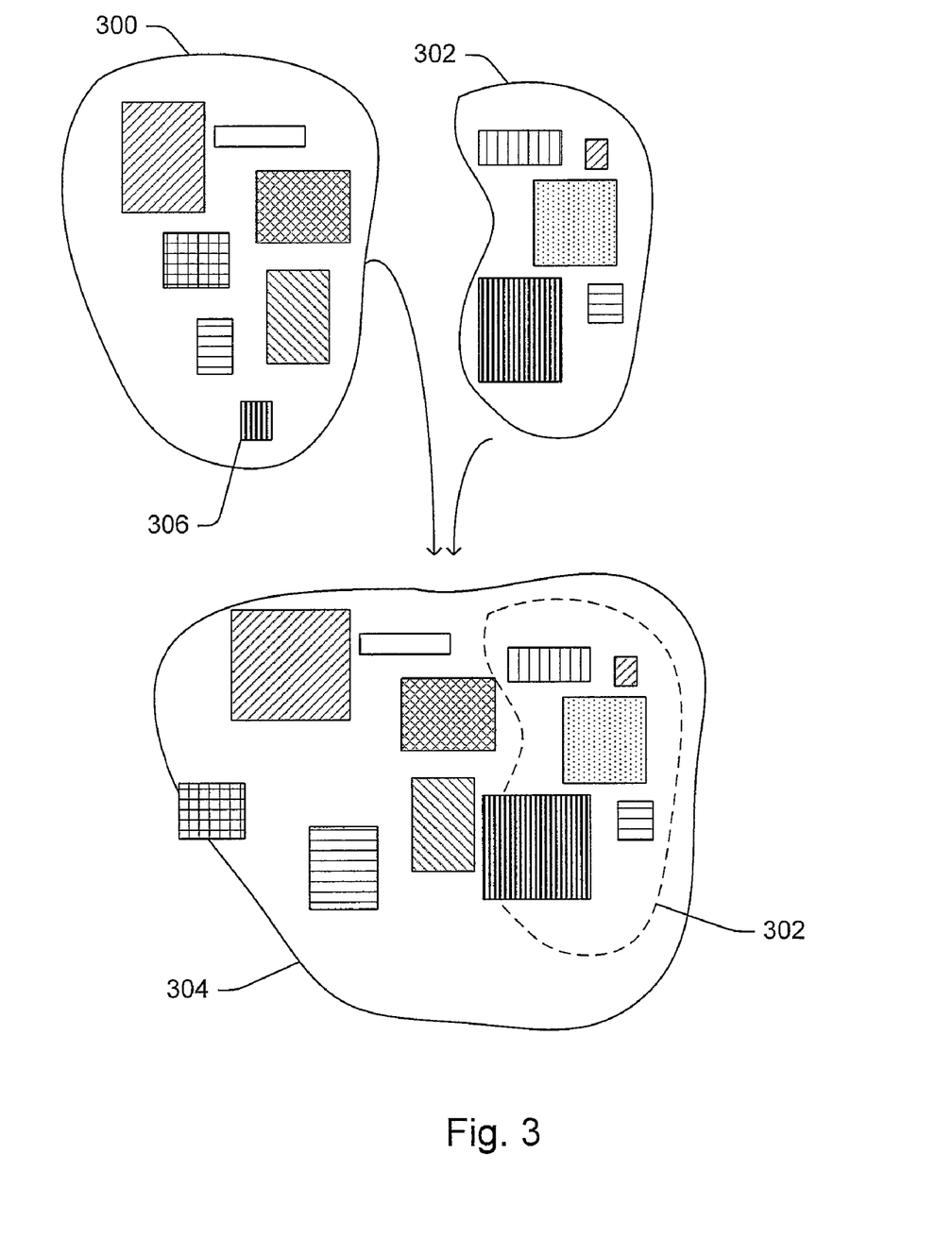
FIG. 3 is a graphical depiction of certain hierarchical structure information that may be associated with ranking functions and different search domains.

FIG. 3 graphically illustrates some differences between such models and training data. Here, for example, the base model associated with the source domain is represented by distribution 300, the available training data for the target domain is represented as a dedicated model by distribution 302, and an "ideal" adapted model for use with the target domain is represented by distribution 304. Within these various distributions are blocks 306 which represent local areas in a multidimensional space (e.g., "multidimensional bounding boxes") that may be "covered" by various training data. Here, for illustrative purposes different line-filling has been applied within the blocks to represent different predicted values for the blocks. In certain models (e.g., GBT models), for example, each leaf node may approximately model one of these blocks.

Note that although certain subtle distributional differences might be captured by training with only the available training data associated with the target domain, e.g., as illustrated in the dedicated model by distribution 302. Such a model may, for example, be heavily biased and/or overfitting to the small data set. Simply combining the dataset from the source domain and that from the target domain may not work well either. Thus, tree adaptation may be implemented to allow for better focusing and fine tuning of certain local parts of the model, which may correspond to local areas in the multidimensional space with a reduced likelihood of overfitting.

Some exemplary tree adaptation processes (e.g., algorithms) will now be described in greater detail. Such tree adaptation processes may, for example, be related to a mechanism of regression tree modeling. In a regression tree, for example, from a root node to a leaf node, each internal node may represent a partitioning condition that may be imposed on a certain dimension (e.g., one or more features), and each path of the tree may represent a specific multidimensional bounding box. Furthermore, from top down, a parent bounding box may enclose one or more children bounding boxes. Record(s) falling into the same box may be assigned the same predicted value (e.g., response), for example, as illustrated in FIG. 2.

In accordance with certain exemplary aspects of tree adaptation, a tree adaptation process may be implemented to (slightly) tune one or more boundaries and/or the response of a bounding box, at least in part, on data distribution of the target domain to adapt the base model to account for certain (subtle) distributional differences.

Due to the complexity of some tree structures, those skilled in the art will understand there are numerous strategies for tuning a base model which may be adapted in accordance claimed subject matter and the present description. With this in mind, a few representative tree adaptation processes are presented as examples below. Claimed subject matter is not intended to be limited however to these examples.

The first exemplary tree adaptation process is directed to tuning responses only (RO). Here, for example, a strategy may be implemented to fix all or part of the boundaries of the bounding boxes and focus on tuning (adapting) responses only. Such an RO process/strategy (as well as some of the other exemplary processes/strategies presented below) may employ a probability based tuning algorithm. For example, one may assume there are a certain number of records, $n_0$, from the source domain $D_0$ (e.g., the training data for the base model), and $n_1$ from $D_1$ (e.g., the available training data for the target domain), falling onto the same bounding box, respectively. Hence, one may provide for the two populations to vote for a final decision with regard to the response associated with the bounding box. For example, by appropriately aligning up or otherwise considering a size difference between the two sets of data, one may generate weights for each vote and then compose a final decision for the response.

By way of example but not limitation, an RO process may be adapted to determine such weights as follows. First, assume that a certain node at the base model, which may be an internal node or a leaf node, has a node response $r_0$ and $n_0$ records from the base training data that are enclosed by the bounding box associated with this node. Next, apply the available training data from $D_1$ to the tree and determine a response $r_1$. Note, that there are $n_1$ $D_1$ records falling onto that node. Here, it may be assumed, for example, that the distribution that the two sets of points will fall on this node follow or at least approximately follow a binomial distribution, and the corresponding probabilities are $p_0$ and $(1-p_0)$ for the source data and target data, respectively. Hence, a balanced estimate of the combined response may be suggested as $$r_{comb} = p_0 \times r_0 + (1-p_0) \times r_1 \quad \text{(Equation 1)}$$

wherein, $r_{comb}$ may be used as a tuned response value for this node. Next, the RO process may try to estimate $p_0$ based on the two sample populations on this node. Since the original data sets are likely to have unequal size, the smaller sized target data may be scaled up, for example, with an appropriate factory $\beta$. As such, based on the sample populations and $\beta$, one may estimate $p_0$ as follows.

$$\hat{p}_0 = \frac{n_0}{n_0 + \beta \times n_1} \quad \text{(Equation 2)}$$

The appropriate $\beta$ may, for example, be determined through cross-validation or the like. This population based estimation may also be applied to other processes as Well.

A second exemplary tree adaptation process is directed to tuning both of at least one bounding box and at least one associated response (BR). As previously described, each leaf node in a decision tree may correspond to a bounding box. Each internal node in a path from a root node to a leaf node may be associated with a condition (e.g., a feature $F<\tau$, where $\tau$ may be a threshold), which makes one of the dimensions for such a bounding box. In an exemplary BR process, one may keep the feature F unchanged and instead tune the threshold $\tau$. Those skilled in the art will recognize that there may be a few options in terms of the intensity of changing the structure of a base model in such a manner. While an exemplary option is described below, it should be clear that claimed subject matter is not intended to be limited to just this exemplary option.

Assuming that a current node has a split with feature $F, F<v_0$, an exemplary BR process may implement the following steps:

(1) calculate a weight $\hat{p}_0$ (e.g., with Equation 2 above);
(2) adjust a response for the current node (e.g., with Equation 1 above);
(3) partition the target data with a specific feature f and find the best split point $v_1$;
(4) adjust the split by $$v_{comb} = \hat{p}_0 \times v_0 + (1-\hat{p}_0) \times v_1$$

(5) repartition the target data with the condition $f<v_{comb}$; and
(6) move to the child nodes and repeat the above steps (1) through (6), or ending the path (trimming the branch) if there is no new data points falling onto any of the child nodes).

Figure 4:
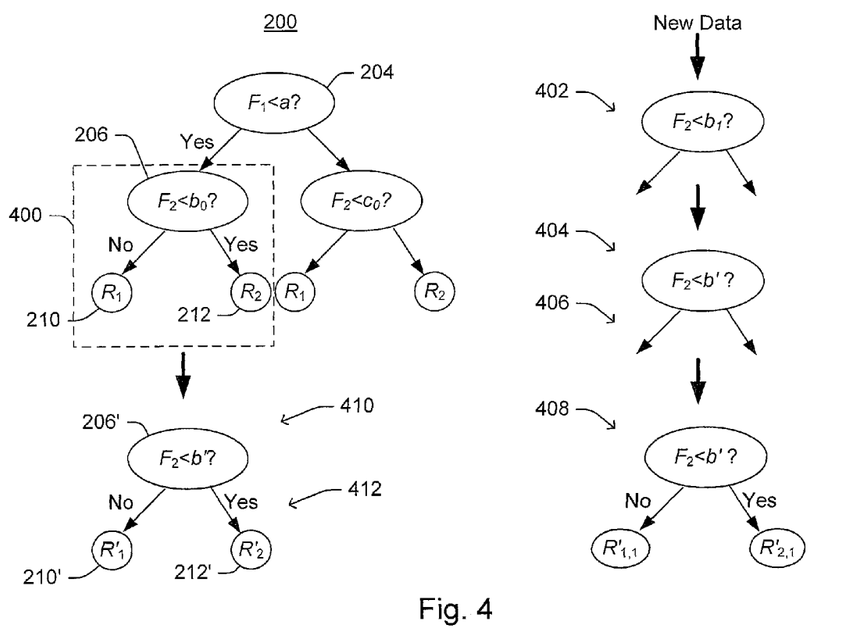
FIG. 4 is a graphical depiction of certain hierarchical structure information that may be accessed and adapted for use with another search domain.

FIG. 4 graphically illustrates a portion of a tree structure undergoing an adaptation in accordance with an exemplary BR process. Here, for example, the top left tree is a base model 200 from FIG. 2. In this example, there are two threads, wherein the first thread illustrates generating and updating the tree for the target data (right side of drawing) and the second thread illustrates updating the base tree (left side of the drawing). Here, the output of the second thread (left side) may then be used as the final adapted model. Such a BR process may, for example, be repeated for any nodes in the subtrees and applied to all trees in a base model.

With regard to FIG. 4, attention is first drawn to current node 400, which is shown on the left side within base model 200. Current node 400 includes internal node 206 and leaf nodes 210 and 212. Next, attention is drawn to the right side wherein at 402 a new split $b_1$ may be generated based, at least in part, on the target data. At 404, new/old splits may be synthesized, e.g., $b'=f(b_0,b_1)$. At 406 the data may be redistributed. At 408, steps may be repeated for the children nodes. At 410, the base model may be adapted to include the split change with internal node 206☐. At 412, the base model may be adapted to include synthesized responses 210☐ and/or 212☐.

A third exemplary tree adaptation process is directed to tuning by growing and/or appending one or more additional trees (AT). Since a base model may be tailored for a source domain (or some general purpose), which may not include certain features that may be more specific and/or unique to the target domain, an AT process may be implemented. Here, for example, an AT process may be implemented to: (1) "grow" one or more trees to potentially incorporate such "new" features, and/or (2) append additional trees to the adapted based model, which may be trained on the residues from the adapted base model.

Considering that growing each individual tree in the base model may potentially overfit the model, in practice, an AT process may be adapted to use the second strategy (2) to append additional trees to the base model, to capture certain domain specific features.

A few example implementations have been presented in detail for adapting hierarchical structures such as trees to allow for an established ranking function to be adapted for use with a different domain. Some the of aspects of the illustrated techniques will now be further highlighted and presented with respect to methods and apparatuses associated with certain exemplary computing environments. Again, these are only a few examples and are as such are not intended to limit claimed subject matter.

Figure 5:
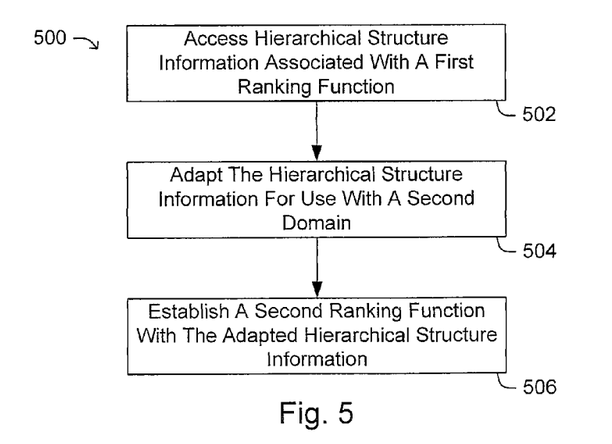
FIG. 5 is a flow diagram illustrating an exemplary method that may, for example, be implemented to adapt a first ranking function for use with another search domain.

Attention is now drawn to FIG. 5, which is a flow diagram illustrating an exemplary method 500 that may be implemented for adapting a source (first) domain ranking function for use in a target (second) domain. At block 502, hierarchical structure information associated with a first ranking function may be accessed. Here, for example, the first ranking function may be adapted for use by a first search engine that may be associated with a first domain. At block 504, the hierarchical structure information may be adapted based, at least in part, on a distribution of first training data associated with the first domain and a distribution of second training data associated with a second domain. For example, block 504 may include one or more of an RO, BR, and/or AT process, or other like adaptive process.

At block 504, in certain implementations, the adapted hierarchical structure information may logically establish a plurality of bounding boxes, and the second ranking function may be adapted to determine a value for a record, and each of two or more records determined to be in one bounding box may be determined to have a value associated with the one bounding box.

In certain implementations, at least one of the hierarchical structure information and/or the adapted hierarchical structure information may include tree structure information having at least one root node, at least one internal node, and a plurality of leaf nodes logically arranged in a hierarchy establishing a plurality of paths. Here, for example, at least one internal node may logically represent a partitioning condition imposed on a dimension, and each of a plurality of paths may logically represent at least a portion of a bounding box.

Block 504 may include, for example, adapting at least a portion of hierarchical structure information by establishing at least one partitioning condition associated with at least one bounding box based, at least in part, on the first training data associated with at least one bounding box and the second training data associated with the bounding box.

Block 504 may include, for example, establishing at least one partitioning condition associated with at least one bounding box by determining at least one threshold associated with at least one partitioning condition based, at least in part, on the first training data associated with the bounding box and the second training data associated with the bounding box.

Block 504 may include, for example, establishing at least one partitioning condition associated with at least one bounding box by determining at least one weighted threshold for at least one of the first training data associated with the bounding box and/or the second training data associated with the bounding box. Here, for example, block 504 may include determining the at least one weighted threshold based, at least in part, on a size difference between a first training data set comprising the first training data and a second training data set comprising the second training data.

Block 504 may include, for example, establishing additional tree structure information defining at least one additional path based, at least in part, on the second training data.

Block 504 may include, for example, establishing additional tree structure information defining at least one additional path based, at least in part, on at least one training residue associated with the first training data and the second training data.

Block 504 may include, for example, adapting at least one of at least one logical boundary and/or a value associated with at least one of the plurality of bounding boxes based, at least in part, on the data distribution of the first training data and the distribution of second training data.

Block 504 may include, for example, determining a value associated with at least one bounding box based, at least in part, on the first training data associated with the bounding box and the second training data associated with the bounding box. Here, for example, block 504 may include determining at least one weighted vote based, at least in part, on a size difference between a first training data set comprising the first training data and a second training data set comprising the second training data.

At block 506, a second ranking function adapted for use by a second search engine may be established. Here, for example, the second search engine may be associated with are the second domain and the second ranking function may be associated with the adapted hierarchical structure information. In certain implementations, the first and second search engines may be the substantially the same search engines, while in other implementations the first and second search engines may be substantially different search engines.

Figure 6:
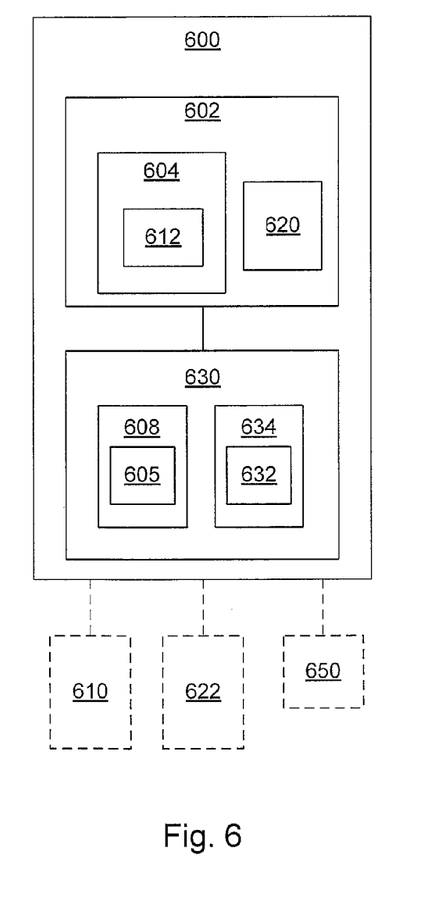
FIG. 6 is a block diagram illustrating an exemplary device that may, for example, used to adapt a first ranking function for use with another search domain.

FIG. 6 is a block diagram illustrating certain exemplary features of device 600 that may be used to adapt a source domain ranking function for a target domain. Here, for example, device 600 may include memory 602 that may be adapted to store hierarchical structure information 604 associated with a first ranking function 605 adapted for use by a first search engine 608 in a first domain 610. Here, for example, hierarchical structure information 604 may include first training data 612. Memory 602 may be being further adapted to store second training data 620 associated with a second domain 622.

Device 600 may also include at least one processing unit 630 coupled to memory 602. Processing unit(s) 630 may, for example, be adapted to establish a second ranking function 632 adapted for use by a second search engine 634 in second domain 622, by the adapting hierarchical structure information based, at least in part, on a distribution of the first training data and a distribution of the second training data.

Device 600 may be adapted to operatively couple to a computer readable medium 650. Computer readable medium 650 may include, for example, computer implementable instructions stored thereon, which if implemented adapt one or more processing units 630 to access hierarchical structure information associated with a first ranking function adapted for use by a first search engine in a first domain the hierarchical structure information comprising first training data, access second training data associated with a second domain, and establish a second ranking function adapted for use by a second search engine in the second domain, by the adapting the hierarchical structure information based, at least in part, on a distribution of the first training data and a distribution of the second training data.

Figure 7:
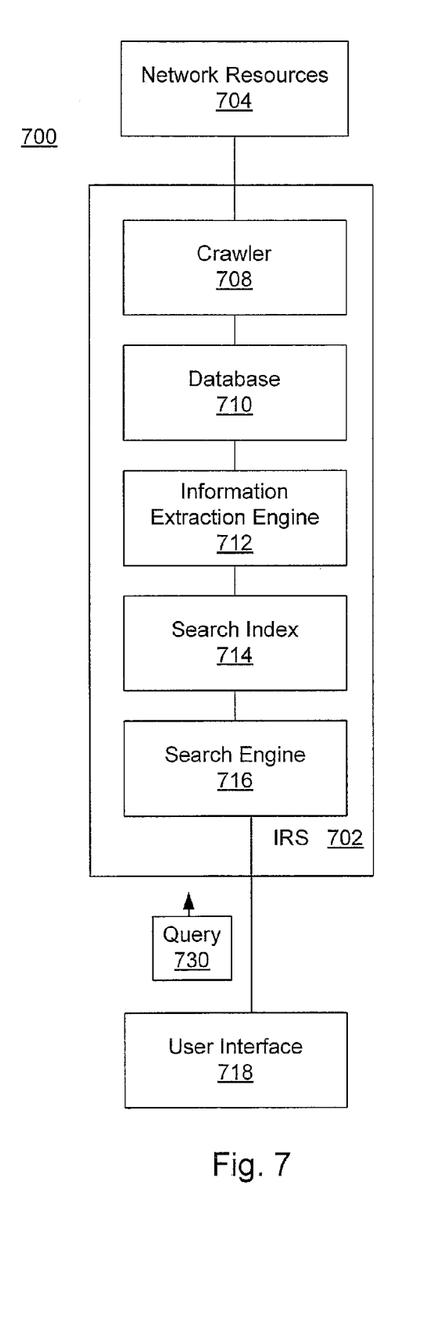
FIG. 7 is a block diagram illustrating an exemplary computing environment including an information retrieval system that may, for example, be adapted for use with different search domains.

Attention is now drawn to FIG. 7, which is a block diagram illustrating an exemplary computing environment 700 having an Information Retrieval System (IRS) 702. The context in which such an IRS may be implemented may vary. For non-limiting examples, an IRS such as IRS 702 may be implemented for public or private search engines, job portals, shopping search sites, travel search sites, RSS (Really Simple Syndication) based applications and sites, and the like. In certain implementations, IRS 702 may be implemented in the context of a World Wide Web (WWW) search system, for purposes of an example. In certain implementations, IRS 702 may be implemented in the context of private enterprise networks (e.g., intranets), as well as the public network of networks (i.e., the Internet).

IRS 702 may include a crawler 708 that may be operatively coupled to network resources 704, which may include, for example, the Internet and the World Wide Web (WWW), one or more servers, etc. IRS 702 may include a database 710, an information extraction engine 712, a search engine 716 backed, for example, by a search index 714 and possibly associated with a user interface 718 through which a query 730 may initiated.

Crawler 708 may be adapted to locate documents such as, for example, web pages. Crawler 708 may also follow one or more hyperlinks associated with the page to locate other web pages. Upon locating a web page, crawler 708 may, for example, store the web page's URL and/or other information in database 710. Crawler 708 may, for example, store an entire web page (e.g., HTML, XML, or other like code) and URL in database 710.

Search engine 716 generally refers to a mechanism that may be used to index and/or otherwise search a large number of web pages, and which may be used in conjunction with a user interface 718, for example, to retrieve and present information associated with search index 714. Here, in accordance with the method 500, for example, search engine 716 may include first search engine 608 and/or second search engine 634.

The information associated with search index 714 may, for example, be generated by information extraction engine 712 based on extracted content of an HTML file associated with a respective web page. Information extraction engine 712 may be adapted to extract or otherwise identify specific type(s) of information and/or content in web pages, such as, for example, job titles, job locations, experience required, etc. This extracted information may be used to index web page(s) in the search index 714. One or more search indexes 726 associated with search engine 716 may include a list of information accompanied with the network resource associated with information, such as, for example, a network address and/or a link to, the web page and/or device that contains the information. In certain implementations, at least a portion of search index 716 may be included in database 710. Search index 716 may, for example, include information associated with one or more search domains, such as a source domain and/or target domain.

Figure 8:
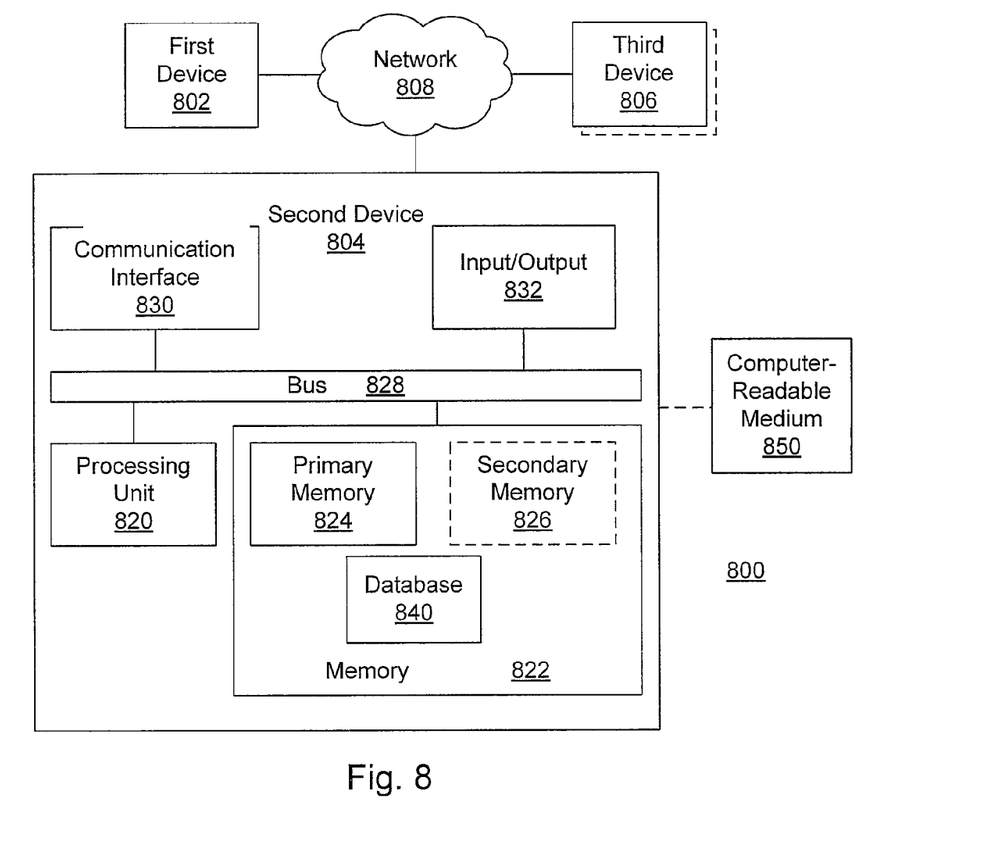
FIG. 8 is a block diagram illustrating an exemplary embodiment of a computing environment system that may be operatively associated with either the device of FIG. 6 and/or the computing environment of FIG. 7.

FIG. 8 is a block diagram illustrating an exemplary embodiment of a computing environment system 800 which may be operatively associated with computing environment 700 of FIG. 7, for example.

Computing environment system 800 may include, for example, a first device 802, a second device 804 and a third device 806, which may be operatively coupled together through a network 808.

First device 802, second device 804 and third device 806, as shown in FIG. 8, are each representative of any device, appliance or machine that may be configurable to exchange data over network 808 and host or otherwise provide one or more replicated databases. By way of example but not limitation, any of first device 802, second device 804, or third device 806 may include: one or more computing devices or platforms, such as, e.g., a desktop computer, a laptop computer, a workstation, a server device, storage units, or the like.

Network 808, as shown in FIG. 8, is representative of one or more communication links, processes, and/or resources configurable to support the exchange of data between at least two of first device 802, second device 804 and third device 806. By way of example but not limitation, network 808 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 806, there may be additional like devices operatively coupled to network 808.

It is recognized that all or part of the various devices and networks shown in system 800, and the processes and methods as further described herein, may be implemented using or otherwise include hardware, firmware, software, or any combination thereof.

Thus, by way of example but not limitation, second device 804 may include at least one processing unit 820 that is operatively coupled to a memory 422 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 and/or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory and/or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 850. Computer-readable medium 850 may include, for example, any medium that can carry and/or make accessible data, code and/or instructions for one or more of the devices in system 800.

Additionally, as illustrated in FIG. 8, memory 822 may include a data associated with a database 840. Such data may, for example, be stored in primary memory 824 and/or secondary memory 826.

Second device 804 may include, for example, a communication interface 830 that provides for or otherwise supports the operative coupling of second device 804 to at least network 808. By way of example but not limitation, communication interface 830 may include a network interface device or card, a modem, a router, a switch, a transceiver, and the like.

Second device 804 may include, for example, an input/output 832. Input/output 832 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 832 may include an operatively adapted display, speaker, keyboard, mouse, trackball, touch screen, data port, etc.

While certain exemplary techniques have been described and shown herein using various methods and apparatuses, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
   with at least one computing device:
      obtaining one or more electrical signals representing hierarchical structure information associated with a first ranking function of a first search engine and a first search domain, wherein said first search domain comprises a multidimensional data space and said hierarchical structure information partitions said multidimensional data space;
      obtaining one or more electrical signals representing first training data associated with said first search domain;
      obtaining one or more electrical signals representing second training data associated with a second search domain;
      generating one or more electrical signals representing adapted hierarchical structure information associated with said second search domain from said one or more electrical signals representing hierarchical structure information based, at least in part, on a distribution of said first training data and a distribution of second training data; and
      establishing a second ranking function in a second search engine associated with said second search domain based, at least in part, on said one or more electrical signals representing adapted hierarchical structure information.

2. The method as recited in claim 1, wherein:
   said adapted hierarchical structure information logically establishes a plurality of multidimensional bounding boxes in a subspace of the multidimensional data space,
   said second ranking function to determine a value for a record, and
   each of two or more records determined to be in one of said bounding boxes is determined to have a value associated with said bounding box.

3. The method as recited in claim 1, wherein:
   at least one of: said one or more electrical signals representing hierarchical structure information, or said one or more electrical signals representing adapted hierarchical structure information comprise: tree structure information having at least one root node, at least one internal node, and a plurality of leaf nodes logically arranged in a hierarchy establishing a plurality of paths, said at least one internal node logically represents a partitioning condition imposed on a dimension, and
   each of said plurality of paths logically represents a bounding box.

4. The method as recited in claim 3, and further comprising:
   with said at least one computing device:
      establishing at least one partitioning condition associated with at least one bounding box based, at least in part, on said first training data associated with said at least one bounding box and said second training data associated with said at least one bounding box.

5. The method as recited in claim 4, wherein establishing said at least one partitioning condition associated with said at least one bounding box comprises determining at least one threshold associated with said at least one partitioning condition based, at least in part, on said first training data associated with said at least one bounding box and said second training data associated with said at least one bounding box.

6. The method as recited in claim 5, wherein establishing said at least one partitioning condition associated with said at least one bounding box comprises determining at least one weighted threshold for at least one of said first training data associated with said at least one bounding box or said second training data associated with said at least one bounding box.

7. The method as recited in claim 6, wherein determining said at least one weighted threshold comprises determining said at least one weighted threshold based, at least in part, on a size difference between a first training data set comprising said first training data and a second training data set comprising said second training data.

8. The method as recited in claim 3, and further comprising:
   with said at least one computing device:
      establishing additional tree structure information defining at least one additional path based, at least in part, on said second training data.

9. The method as recited in claim 3, and further comprising:
   with said at least one computing device:
      establishing additional tree structure information defining at least one additional path based, at least in part, on at least one training residue associated with said first training data and said second training data.

10. The method as recited in claim 1, wherein said one or more electrical signals representing adapted hierarchical structure information logically establishes a plurality of bounding boxes, and further comprising, with said at least one computing device:
    determining at least one of at least one logical boundary or a value associated with at least one of said plurality of bounding boxes based, at least in part, on said data distribution of said first training data associated with said at least one of said plurality of bounding boxes and said distribution of second training data associated with said at least one of said plurality of bounding boxes.

11. The method as recited in claim 1, wherein said one or more electrical signals representing adapted hierarchical structure information logically establishes a plurality of bounding boxes, and further comprising:
    with said at least one computing device:
       determining a value associated with at least one bounding box based, at least in part, on said first training data associated with said at least one bounding box and said second training data associated with said at least one bounding box.

12. The method as recited in claim 11, wherein determining said value associated with at least one bounding box comprises determining at least one weighted vote for at least one of said first training data associated with said at least one bounding box or said second training data associated with said at least one bounding box.

13. An apparatus comprising:
    memory; and
    at least one processing unit to:

obtain from said memory: (1) hierarchical structure information from said memory, said hierarchical structure information being associated with a first ranking function of a first search engine and a first search domain, wherein said first search domain comprises a multidimensional data space and said hierarchical structure information partitions said multidimensional data space; (2) first training data associated with said first search domain; and (3) second training data associated with a second search domain;

generate adapted hierarchical structure information associated with said second search domain from said hierarchical stricture information based, at least in part, on a distribution of said first training data and a distribution of second training data; and establish a second ranking function in a second search engine associated with said second search domain based, at least in part, on said adapted hierarchical structure information.

14. The apparatus as recited in claim 13, wherein said adapted hierarchical structure information logically establishes a plurality of bounding boxes, said second ranking function determine a value for a record, and each of two or more records determined to be in one of said bounding boxes is determined to have a value associated with said bounding box.

15. The apparatus as recited in claim 13, wherein at least one of said hierarchical structure information or said adapted hierarchical structure information comprise tree structure information having at least one root nod; at least one internal node, and a plurality of leaf nodes logically arranged in a hierarchy establishing a plurality of paths, said at least one internal node logically represents a partitioning condition imposed on a dimension, and each of said plurality of paths logically represents a bounding box.

16. The apparatus as recited in claim 15, wherein said at least one processing unit to further establish at least one partitioning condition associated with at least one bounding box based, at least in part, on said first training data associated with said at least one bounding box and said second training data associated with said at least one bounding box.

17. The apparatus as recited in claim 16, wherein said at least one processing unit to further determine at least one of:

at least one threshold associated with said at least one partitioning condition based, at least in part, on said first training data associated with said at least one bounding box and said second training data associated with said at least one bounding box; or at least one weighted threshold for at least one of said first training data associated with said at least one bounding box or said second training data associated with said at least one bounding box.

18. The apparatus as recited in claim 15, wherein said at least one processing unit to further establish additional tree structure information defining at least one additional path based, at least in part, on at least one of said second training data, or training residue associated with said first training data and said second training data.

19. The apparatus as recited in claim 15, wherein said adapted hierarchical structure information logically establishes a plurality of bounding boxes, and wherein said at least one processing unit to further determine at least one of:

at least one of at least one logical boundary or a value associated with at least one of said plurality of bounding boxes based, at least in part, on said data distribution of said first training data associated with said at least one of said plurality of bounding boxes and said distribution of second training data associated with said at least one of said plurality of bounding boxes; or determine a value associated with at least one bounding box based, at least in part, on said first training data associated with said at least one bounding box and said second training data associated with said at least one bounding box.

20. An article comprising:

a non-transitory computer readable medium comprising computer implementable instructions stored thereon executable by one or more processing units to:

access hierarchical structure information associated with a first ranking function of a first search engine and a first search domain, wherein said first search domain comprises a multidimensional data space and said hierarchical structure information partitions said multidimensional data space;

access first training data associated with said first search domain;

access second training data associated with a second search domain;

generate adapted hierarchical structure information associated with said second search domain from said hierarchical structure information based, at least in part, on a distribution of said first training data and a distribution of second training data; and establish a second ranking function in a second search engine associated with said second search domain based, at least in part, on said adapted hierarchical structure information.

* * * * *